(12) United States Patent
Maul et al.

(10) Patent No.: US 7,563,512 B2
(45) Date of Patent: Jul. 21, 2009

(54) COMPONENT WITH A REFLECTOR LAYER AND METHOD FOR PRODUCING THE SAME

(75) Inventors: Armin Maul, Grebenheim/Nösberts (DE); Thorsten Herbert, Mömbris (DE); Jürgen Weber, Kleinostheim (DE); Sven Linow, Darmstadt (DE); Stefan Fuchs, Niedernberg (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 565 days.

(21) Appl. No.: 11/030,561

(22) Filed: Jan. 6, 2005

(65) Prior Publication Data

US 2006/0038470 A1 Feb. 23, 2006

(30) Foreign Application Priority Data

Aug. 23, 2004 (DE) .................. 10 2004 040 833
Oct. 26, 2004 (DE) .................. 10 2004 051 846

(51) Int. Cl.
*B32B 9/00* (2006.01)
(52) U.S. Cl. .................. 428/428; 428/432; 428/446
(58) Field of Classification Search .............. 428/432, 428/446
See application file for complete search history.

(56) References Cited

U.S. PATENT DOCUMENTS

| | | | |
|---|---|---|---|
| 5,479,065 A * | 12/1995 | Sugimoto et al. ........... 313/113 |
| 5,736,206 A | 4/1998 | Englisch et al. | |
| 5,766,680 A | 6/1998 | Schmidt et al. | |
| 6,122,438 A | 9/2000 | Scherzer et al. | |
| 6,380,110 B1 | 4/2002 | Werdecker et al. | |
| 6,672,107 B2 * | 1/2004 | Werdecker et al. ........... 65/17.4 |
| 2003/0129315 A1 | 7/2003 | Suyal et al. | |

FOREIGN PATENT DOCUMENTS

| | | |
|---|---|---|
| DE | 40 22 100 C1 | 10/1991 |
| DE | 44 40 104 A1 | 5/1995 |
| DE | 198 22 829 A1 | 11/1999 |
| DE | 102 43 954 B3 | 7/2004 |
| EP | 0 366 090 A2 | 5/1990 |
| EP | 0 367 269 A2 | 5/1990 |
| WO | WO 01/46079 A1 | 6/2001 |

* cited by examiner

*Primary Examiner*—Timothy M Speer
(74) *Attorney, Agent, or Firm*—Tiajoloff and Kelly LLP

(57) ABSTRACT

In a known component having a reflector layer, the surface of a base body of quartz glass is covered at least in part with a reflector layer. Starting from this, to provide a component, particularly for use in lamp and reflector manufacture, which is equipped with an efficient, chemically and thermally resistant and, nevertheless, inexpensive reflector layer, it is suggested according to the invention that an $SiO_2$ cover layer should be provided which acts as a diffuse reflector and consists of at least partly opaque quartz glass.

4 Claims, 2 Drawing Sheets

COMPONENT WITH A REFLECTOR LAYER AND METHOD FOR PRODUCING THE SAME

Figure 1:
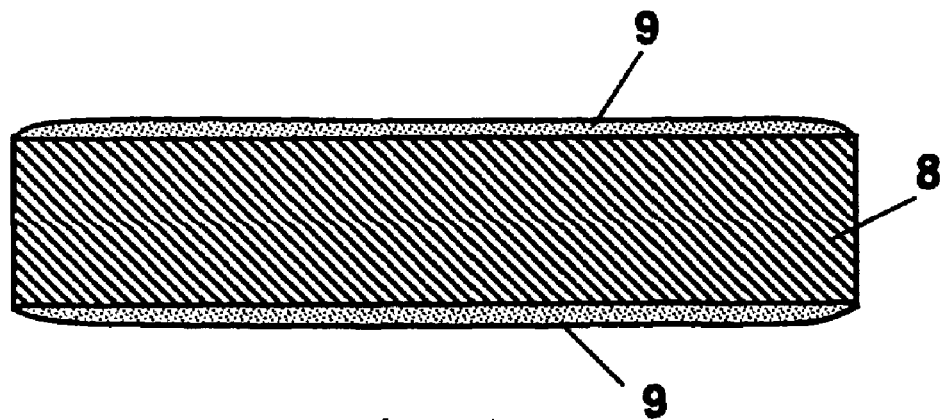

The present invention relates to a component with a reflector layer, comprising a base body of quartz glass having a surface that is covered at least in part with a reflector layer.

Moreover, the present invention relates to a method for producing such a component with a reflector layer by covering the surface of a base body of quartz glass at least in part with a reflector layer.

Quartz glass is characterized by a low coefficient of expansion, by optical transparence over a wide wavelength range and by high chemical and thermal resistance. Quartz glass components are used for many applications, e.g. in lamp manufacture as cladding tubes, bulbs, cover plates or reflector carriers for lamps and radiators in the ultraviolet, infrared and visible spectral range. For obtaining special characteristics quartz glass is doped with other substances.

In lamp manufacture, time constancy and efficiency of the emitted operative radiation often play an important role. To minimize radiation losses, optical radiators are provided with a reflector. The reflector is firmly connected to the radiator, or it is a reflector component separated from the radiator. The surfaces of high-quality reflectors which can be used in a chemically aggressive environment without damage to the reflector and without a noticeable decrease in reflectivity are made of gold.

A generic component in the form of an infrared irradiator equipped with a gold reflector is known from DE 40 22 100 C1. The infrared irradiator serves as a surface irradiator and is composed of a plurality of adjacently arranged lamp tubes of quartz glass that are mounted on a joint carrier plate of quartz glass, each having a heating coil extending therein. The top side of said lamp tube arrangement forms the irradiation surface of the infrared surface irradiator. The free bottom side of the oppositely arranged carrier plate of quartz glass is provided with a reflector layer of gold.

DE 198 22 829 A1 describes a short-wave infrared radiator in which the lamp tube is configured in the form of a so-called twin tube. A cladding tube of quartz glass is here divided by a longitudinal web into two partial sections extending in parallel with one another, a heating coil extending in one or in both sections. The side of the twin tube that faces away from the main irradiation direction of the IR radiation is coated with a gold layer which serves as a reflector.

Reflective layers of gold are however expensive and only resistant to a limited degree to temperatures and temperature variations.

It is therefore the object of the present invention to provide a component, particularly for use in lamp and reflector production, which is equipped with an efficient, chemically and thermally resistant and, nevertheless, inexpensive reflector layer.

Furthermore, it is the object of the present invention to provide a method for producing such a component.

As for the component, this object starting from the above-described quartz glass component is achieved according to the invention by providing an $SiO_2$ cover layer, or reflector layer, which acts as a diffuse reflector and consists of at least partly opaque quartz glass.

In the quartz glass component of the invention, the reflector layer consists of at least partly opaque quartz glass. The $SiO_2$ cover layer covers the base body either wholly or in part and acts as a diffuse optical reflector.

The quartz glass component is preferably used in lamp and reflector manufacture, and it is present in the form of a tube, bulb, a chamber, shell, spherical or ellipsoidal segment, plate, or the like. The quartz glass component is either part of an optical radiator with integrated reflector, said reflector being formed by the $SiO_2$ cover layer, or the component forms a separate reflector for use in combination with an optical radiator.

The base body is a body of quartz glass which is made from synthetically produced or from naturally occurring raw materials. The quartz glass of the base body is transparent as a rule.

It has been found that a cover layer consisting of at least partly opaque quartz glass has a reflectivity that is adequate for most applications. The $SiO_2$ cover layer is characterized by an excellent chemical and thermal resistance and mechanical strength. Particular reference should be made to the high resistance to heat shocks of the $SiO_2$ cover layer on the base body of quartz glass.

Furthermore, the $SiO_2$ cover layer can be produced at low costs. A suitable procedure will be explained in more detail further below. The surface of the base body which is provided as the reflector has applied thereto a layer of a slip containing $SiO_2$ particles, from which the $SiO_2$ cover layer is obtained by subsequent drying and vitrification. Attention must be paid during vitrification that the $SiO_2$ cover layer remains opaque at least in part so that an adequate reflectivity is maintained.

It has turned out to be advantageous when the $SiO_2$ cover layer consists of similar material with respect to the base body.

"Similar material" means in this context that the $SiO_2$ contents of cover layer and base body differ by not more than 3% by wt. from one another, and that in the presence of dopants in the cover layer or in the quartz glass of the base body said dopants influence the coefficient of expansion of both in a similar way. This yields a particularly high adhesion of the cover layer to the base body and, in particular, a high resistance of the composite to thermal shocks.

In a preferred embodiment of the quartz glass component of the invention, the base body is designed as a cladding body of quartz glass provided for receiving a luminous source.

The cladding body of quartz glass serves to receive a luminous source, such as a heating coil, a carbon ribbon or a radiation-emitting glass filling, and at the same time part of the cladding body is provided with the $SiO_2$ cover layer acting as the reflector.

In a first preferred variant of the component of the invention, the $SiO_2$ cover layer is provided on the outside of the cladding body that faces away from the luminous source.

This prevents impairment of the luminous source or of the atmosphere inside the cladding body.

In a second, equally preferred variant of the component of the invention, the $SiO_2$ cover layer is provided on the inside of the cladding body which is oriented towards the luminescent body.

The reflector layer provided on the inside is directly adjacent to the luminous source, so that absorption losses due to the material of the cladding body are avoided. It is often easier to apply the cover layer on the inside than on the outside, and said layer is particularly protected by the cladding tube against mechanical damage.

As for the method, this object starting from the above-mentioned method is achieved according to the invention in that a slip containing amorphous $SiO_2$ particles is produced and applied to the surface of the base body with formation of a slip layer, the slip layer is dried and is then vitrified forming the $SiO_2$ cover layer.

In the method of the invention, the base body of quartz glass is provided by means of a slip casting method with a cover layer of $SiO_2$. A special technical challenge is that any tearing of the slip layer is avoided during drying or vitrification although the volume of the layer shrinks without the quartz glass of the base body being able to yield accordingly.

To this end a castable slip is first produced that contains amorphous $SiO_2$ particles. The slip is applied as a "slip layer" to the base body and is subsequently dried and vitrified. Due to the described interactions the amorphous $SiO_2$ particles already stabilize the slip layer in the pasty and dry state and they promote the sintering action, which permits the sintering of the dried slip layer at a comparatively low temperature with formation of a dense and crack-free $SiO_2$ cover layer.

The $SiO_2$ particles consist of synthetically produced $SiO_2$ or of purified and naturally occurring raw material, as is e.g. described in DE 44 40 104 C2.

Apart from the amorphous $SiO_2$ particles, the slip may also contain precursor components for the formation of $SiO_2$ particles. These are hydrolyzable silicon compounds as are used in sol-gel methods for producing $SiO_2$. Such precursor components form molecular bonds in the slip layer due to their hydrolysis, they effect a consolidation, thereby facilitating sintering. On the other hand, however, high concentrations of them lead to a high shrinkage in drying, and they may contribute to the formation of cracks, which limits the amount of such precursor components in the slip.

Particle size and distribution of the $SiO_2$ particles have effects on the drying shrinkage of the slip layer. For instance, the shrinkage in drying can be reduced by using coarse $SiO_2$ particles.

The drying of the slip layer is carried out by removing moisture at room temperature, by heating or by freeze drying. After drying the slip layer is vitrified in that it is heated to a high temperature that leads to a sintering of the $SiO_2$ particles and to the formation of a dense and crack-free cover layer of opaque or partly opaque quartz glass, which covers the whole surface of the base body, or part thereof.

With the method of the invention it is possible to produce $SiO_2$ cover layers having a high density, so that said method offers a preferred possibility of producing the reflector layer from at least partly opaque $SiO_2$.

For the formation of the cover layer $SiO_2$ particles are preferably used that have a particle size in the range of up to not more than 500 μm, preferably of up to not more than 100 μm, $SiO_2$ particles with particle sizes in the range between 1 μm and 50 μm accounting for the greatest volume fraction.

$SiO_2$ particles in this order of magnitude show an advantageous sintering behavior and a comparatively low shrinkage in drying. It has been found that in such a slip the slip layer can be dried and vitrified in a particularly easy way without the formation of cracks. This may be due to a sufficiently low shrinkage in drying and to interactions of the $SiO_2$ particles with one another that may even lead to the formation of molecular $SiO_2$ bonds and facilitate drying and sintering.

This effect is promoted when the $SiO_2$ particles are produced by wet milling $SiO_2$ start granules.

The desired particle size distribution is here adjusted by the homogenization process of the slip. Starting from comparatively coarse grains with diameters ranging e.g. between 200 μm and 5000 μm, the $SiO_2$ particles are reduced in size during homogenization, depending on their degree of consolidation. Wet milling creates $SiO_2$ particles of any size within the slip, i.e. also those that, interacting with one another, form the above-described bonds already in the slip, which improves the stability of the slip layer.

The cristobalite amount in the dried $SiO_2$ slip layer should be not more than 1% by wt. because, otherwise, crystallization might occur during vitrification of the slip layer, which may lead to waste of the component.

It has turned out to be of advantage when the surface of the base body is roughened prior to the application of the slip.

Roughening effects improved adhesion of both the slip layer and the dense $SiO_2$ cover layer produced therefrom by vitrification. Roughening is carried out mechanically (e.g. by grinding or sand blasting) or chemically (by etching).

In this respect it has turned out to be particularly useful when the slip layer is applied to a surface having a mean surface roughness $R_a$ of at least 0.5 μm.

For the application of the slip layer, the methods known per se, such as spraying, electrostatically supported spraying, flow coating, spinning, or application by a brush, have turned out to be useful. Preferably, however, the slip layer is formed by immersion.

The application of the slip layer by immersion makes it possible to observe a predetermined thickness of the slip layer, and thus of the resulting $SiO_2$ cover layer, without any great efforts in terms of construction or control engineering.

In an alternative, but equally preferred, procedure, the slip layer is applied by spraying.

It has been found that a slip layer produced by spraying shows particularly good adhesion. A previous roughening of the component surface can thus be omitted.

The risk of crack formation during vitrification can also be reduced through a suitable temperature control. Preferably, the vitrification of the dried slip layer is carried out at a comparatively low maximum temperature in the range between 1000° C. and 1600° C., preferably between 1100° C. and 1400° C.

The low maximum temperature prevents a rapid densification of the outer surface portions of the slip layer during vitrification. Such a densification would impede the further progress of a vitrification front due to its thermally insulating effect, thereby making a complete sintering of thick layers more difficult.

In a particularly preferred variant of the method, the dried slip layer is vitrified in a hydrogen atmosphere.

Due to its high diffusion rate in quartz glass, hydrogen is particularly suited for a heat transmission. A high heat transmission has the effect that a temperature gradient that is as flat as possible is formed between the high temperature prevailing on the surface and the lower temperature inside the $SiO_2$ cover layer or the portion that has not vitrified yet. Even at low vitrification temperatures the progress of the melt front from the outside to the inside and thus a vitrification also of inner portions of the slip layer are thereby ensured. A hydrogen content of at least 70% is sufficient therefor. Apart from hydrogen, the atmosphere during vitrification may e.g. also contain nitrogen, and preferably helium.

However, with respect to necessary safety precautions a vitrification process under hydrogen is however comparatively complicated. Therefore, it has turned out to be advantageous for many applications when the dried slip layer is vitrified in air.

The vitrification in air does not require special safety measures and is inexpensive and leads to the desired opaque $SiO_2$ cover layers.

As an alternative, it has also turned out to be useful when the dried slip layer is vitrified by means of a burner flame.

This variant of the method yields a flame-polished surface which is also without cracks. The heat action is here short in time and can easily be limited to the portions that are covered with an $SiO_2$ slip layer to be vitrified, so that plastic deformations can be avoided to a large extent.

If a particularly great thickness of the $SiO_2$ cover layer is needed, the layer is advantageously reinforced in successive steps by carrying out the method of the invention repeatedly.

Furthermore, it has turned out to be useful when dopants are added to the slip in the form of compounds containing aluminum, nitrogen or carbon.

In this variant of the method, a dopant or several dopants are introduced into the $SiO_2$ cover layer, the dopants giving the quartz glass a specific property, such as a decrease in absorption and thus an improved reflection.

For instance, an addition of aluminum in the quartz glass of the cover layer forms $Al_2O_3$ which enhances the stiffness of the glass structure and thus the temperature resistance of the cover layer and also changes the refractive index. Suitable start substances are distributed in the slip in a particularly uniform manner, which in the end results in a homogeneous doping of the quartz glass of the cover layer.

The $SiO_2$ cover layer produced in this way is characterized by high adhesion to quartz glass and can easily be modified in its properties by simply changing the method, e.g. the vitrification temperature or the addition of dopants, and can be adapted to many concrete applications.

Figure 2:
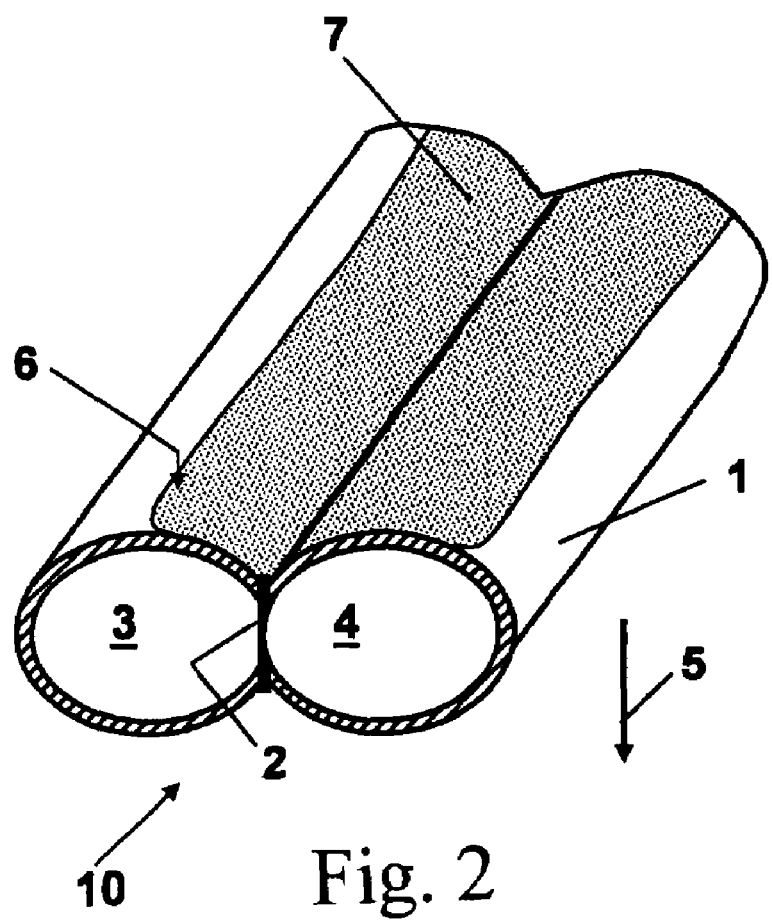
Figure 3:
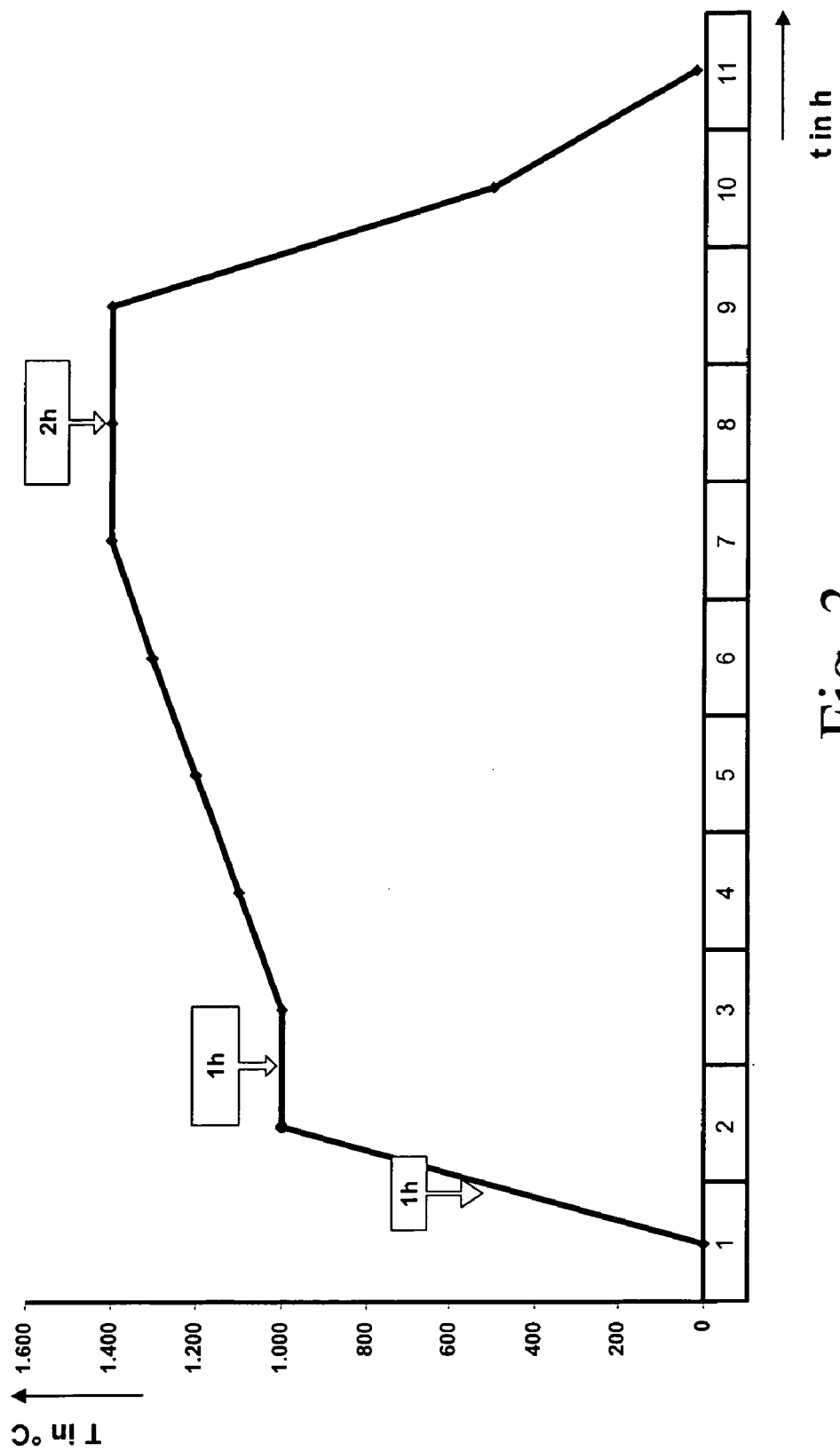

The invention shall now be explained in more detail with reference to embodiments and a drawing. The drawing shows in detail in FIG. 1 a schematic illustration of a reflector plate of quartz glass with a reflector layer in the form of an $SiO_2$ cover layer, viewed in cross section;

FIG. 2 a schematic illustration of an infrared radiator in the form of a twin-tube radiator with a cladding tube, whose upper side is partly covered with a slip layer or a reflector layer;

FIG. 3 shows a heating profile for vitrifying a slip layer on a base body of quartz glass.

EXAMPLE 1

A homogeneous base slip is produced. For a batch of 10 kg base slip ($SiO_2$ water slip) 8.2 kg of amorphous quartz glass granules of natural raw material with grain sizes ranging from 250 μm to 650 μm are mixed with 1.8 kg deionized water of a conductivity of less than 3 μS in a drum mill lined with quartz glass and having a volume contents of about 20 l. The quartz glass granules were purified in a hot chlorination method before. Attention is paid that no cristobalite is contained.

This mixture is ground by means of milling balls of quartz glass on a roller block at 23 rpm for three days to such a degree that a homogeneous base slip is formed with a solids content of 79%. In the course of the grinding process the pH value is lowered to a pH of about 4 due to the dissolving $SiO_2$.

Further amorphous $SiO_2$ granules with a grain size of about 5 μm are admixed to the resulting homogeneous and stable base slip until a solids content of 84% by wt. is obtained. This mixture is homogenized in a drum mill at a speed of 25 rpm for 12 hours. The resulting slip has a solids content of 84% and a density of about 2.0 g/cm³. The $SiO_2$ particles obtained in the slip 14 after milling of the quartz glass granules have a particle size distribution characterized by a $D_{50}$ value of about 8 μm and by a $D_{90}$ value of about 40 μm. This slip is dilatant. The rheological property of the slip, which is designated as "dilatancy", becomes apparent in that the viscosity thereof increases with the shear rate. This has the effect that in the absence of shear forces, i.e. after application of the slip as a slip layer to the component of quartz glass, the viscosity increases, which facilitates the formation of a uniform slip layer.

A quartz glass plate from which a reflector plate is to be produced for an IR radiator is immersed into the slip for a few seconds. The surface of the quartz glass plate was cleaned in alcohol before and adjusted by chemical etching (deep freezing) to a mean surface roughness $R_a$ of 2 μm.

A uniform, continuous slip layer having a thickness of about 0.35 mm is formed on the quartz glass plate. This slip layer is first dried at room temperature for about five hours and subsequently by means of an IR radiator in air. The dried slip layer is free from cracks and has a mean thickness of slightly less than 0.3 mm.

The slip layer produced and dried in this way is then vitrified in air in a sintering furnace. The heating profile comprises an initially steep heating ramp while the slip layer is heated from room temperature within one hour to a lower heating temperature of 1000° C. The slip layer is kept at the lower heating temperature for one hour and is then heated through a second flat heating ramp for four hours to an upper heating temperature of 1350° C. The holding time at the upper heating temperature is two hours in the embodiment. Subsequently, the slip layer is completely sintered, it is opaque and without bubbles as far as can be seen with the naked eye.

The subsequent cooling process takes place in the furnace in air down to a temperature of 500° C. at a controlled cooling rate of 15° C./min and then in the still closed state of the furnace by way of free cooling.

The resulting reflector plate is schematically shown in FIG. 1. It consists of the quartz glass plate 8 having the dimensions 300 mm×300 mm×2 mm, whose flat sides are fully covered with an $SiO_2$ cover layer 9 which consists of opaque quartz glass and has a mean layer thickness of about 0.2 mm, and which is characterized by freedom from cracks and by a high density of about 2.15 g/cm³. The $SiO_2$ cover layer 9 in FIG. 1 is drawn with an exaggerated thickness for reasons of illustration.

This reflector plate is thermally resistant up to temperatures above 1100° C. and is e.g. suited as a substitute for reflector plates of molybdenum, which are otherwise used for such high-temperature applications.

Instead of the formation of an opaque $SiO_2$ cover layer at both sides, the quartz glass plate may also be provided with such a layer at one side. The slip layer is preferably applied here by spraying instead of the above-described immersion.

The $SiO_2$ cover layer 9 effects a diffuse undirected reflection on phase boundaries. Due to a curved or arched geometry of the component, as is otherwise also usual in reflectors, a directed portion can be applied to the diffuse reflection.

EXAMPLE 2

A base slip is produced, as described with reference to Example 1, the slip being used for producing a reflector layer on a cladding tube for an infrared radiator in the form of a so-called "twin tube" of quartz glass.

Such a twin tube is schematically shown in FIG. 2. This tube consists of a cladding tube 1 of quartz glass which is in the form of an 8 when viewed in cross section, the tube being subdivided by a central web 2 into two sections 3, 4. Each of the sections 3, 4 serves to receive a heating coil, the electrical connections being guided out of the cladding tube 1 via crimps provided at the ends (not shown in FIG. 2). The main radiation direction of the twin tube 10 is oriented downwards in the embodiment and symbolized by the directional arrow 5.

A reflector is to be formed on the upper side 6 of the twin tube 10 which is oriented away from the main radiation direction 5. To this end the surface of the twin tube 10 is cleaned by means of alcohol and then in 30% hydrofluoric acid for eliminating other surface impurities, e.g. alkali and alkaline-earth compounds.

The base slip is subsequently applied to the upper side 6 of the cladding tube 1. To this end the cladding tube 1 is mounted on a mounting device and the free-flowing slip is sprayed to the upper side 6 by means of a spray nozzle. The spraying operation will be terminated as soon as a uniform coating has been achieved.

The slip dries in air very rapidly. The layer thickness of the slip layer 7 produced in this way is about 0.5 mm.

The slip layer 7 is then slowly dried by resting in air for 6 hours. Complete drying is accomplished in air using an IR radiator. The dried slip layer 7 is without any cracks, and it has a maximum thickness of about 0.4 mm.

The dried slip layer 7 is then vitrified in a sintering furnace in air atmosphere. The heating profile for vitrifying the slip layer 7 is shown in FIG. 3. It comprises a heating ramp in which the slip layer 7 is heated from room temperature within one hour to a lower heating temperature of 1000° C. The component is kept at this heating temperature for one hour. Subsequently, a slow heating process takes place for four hours to achieve a final temperature of 1400° C., which is held for two hours. Cooling takes place with a cooling ramp of 15° C./min to a furnace temperature of 500° C. and then in an uncontrolled manner in the closed furnace.

The slip layer is fully sintered and consolidated by this temperature treatment. The resulting $SiO_2$ cover layer has a high density of about 2.15 g/cm$^3$, but is substantially still opaque. Opacity is demonstrated in that the direct spectral transmission is below 10% in the wavelength range between 190 nm and 2650 nm. This yields a correspondingly high degree of reflection around 80% in the infrared wavelength range. The twin tube 10 is used for producing an infrared radiator, the $SiO_2$ cover layer, which is produced thereon, is also suited as a reflector layer for high temperatures above 1000° C.

The use of quartz glass components that are provided with such a diffuse reflector in the form of an $SiO_2$ cover layer is not limited to lamp manufacture. Such reflectors are also used as separate components, e.g. for radiators in analyzing systems or for heating means in solar cell production.

The invention claimed is:

1. A component with a reflector layer forming a reflector for an optical radiator or a part of an optical radiator, said component comprising: a base body of quartz glass configured to receive a luminous source therein, and having a surface covered at least in part with an $SiO_2$ cover layer which acts as a diffuse reflector and is of at least partly opaque quartz glass containing cristobalite in an amount not more than 1 wt %, wherein the $SiO_2$ contents of the cover layer and the base body differ by no more than 3% by wt. from one another.

2. The reflector according to claim 1, wherein the base body is formed as a cladding body of quartz glass which configured to receive the luminous source therein.

3. The reflector according to claim 2, wherein the $SiO_2$ cover layer is on an outside of the cladding body of quartz glass that is oriented away from the luminous source.

4. The reflector according to claim 2, wherein the $SiO_2$ cover layer is provided on an inside of the cladding body of quartz glass that is oriented towards the luminous source.

* * * * *